June 3, 1969        F. S. SLICK        3,447,239

PRELOADING MEANS FOR MAGNETO BEARINGS

Filed Jan. 24, 1966        Sheet _1_ of 2

INVENTOR
FRED S. SLICK
BY
AGT.

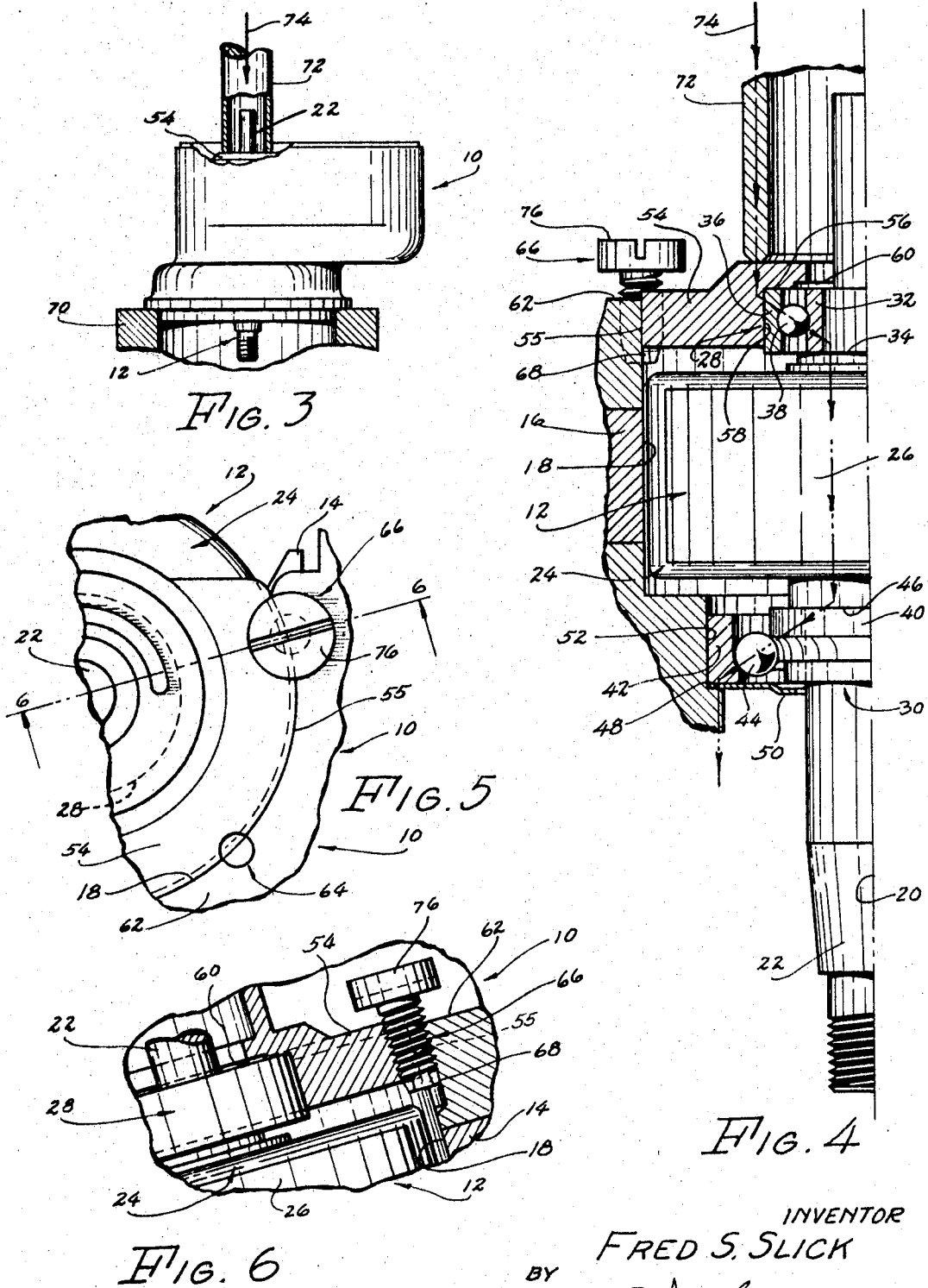

United States Patent Office 3,447,239
Patented June 3, 1969

3,447,239
PRELOADING MEANS FOR MAGNETO BEARINGS
Fred S. Slick, Rockford, Ill., assignor to Slick Electro Inc., Rockford, Ill., a corporation of Illinois
Filed Jan. 24, 1966, Ser. No. 522,455
Int. Cl. H02k 15/00, 15/14; H02h 15/16
U.S. Cl. 29—596                                     1 Claim

ABSTRACT OF THE DISCLOSURE

A means of assembling magnetos of the disposable type in which a suitable axial preloading pressure is applied to the armature bearings, and the assembly then fixed thereat. The fastening means employed to establish the preloading pressure comprises driving "self-threading" members between the mutually-adjoining surfaces of the bearing-supporting member and the magneto frame while the preloading pressure is being maintained.

---

This invention concerns magnetos, and especially the type of magnetos employed with aircraft power plants. Periodic servicing of aircraft power plants frequently involves work on the magneto which is an expensive and necessary service calling for skilled personnel. The power plant is out of service when the magneto is being repaired unless a replacement unit is provided. One solution to the objectionable high cost of magneto servicing is to provide the power plant with an original magneto obtainable at a cost sufficiently low to warrant replacing the unit by another when it appears to need servicing. The most frequent and common point of failure in aircraft magnetos concerns the ball bearings that support the armature shaft in the frame.

When an armature is being assembled in the magneto frame, in the absence of this invention, the bearings are usually assembled on the armature shaft. The armature assembly is then inserted in the frame and usually includes a bearing plate employed to secure the armature against axial displacement. The usual screws are then put in place to hold the plate in the frame. The "axial end play" of the armature is then tested by means of a suitable indicator. If the indicator reading gives a reading in excess of the permissible tolerance, the armature assembly is removed and a shim or spacer of the desired thickness is placed between the shaft shoulder and one bearing. The armature assembly is then re-assembled in the frame and the screws replaced. This procedure approximately provides a permissible amount of initial "axial play," and assures that excessive pressure is not applied to the bearings. A condition, however, exists with respect to the tolerances allowed by the bearing manufacturer which permits "play" between the balls and their races. This "play" permits the armature to shift axially, and to also shift in a direction normal to the axis. It is well recognized that such "play" will tend to increase in magnitude because wear, to a point where the bearings must be replaced, or the entire magneto unit replaced by another. The bearings are subjected to severe treatment because the magnetic flux passing between the pole pieces traverses the armature normal to the axis thereof, and are alternately "cut across" by the armature segments during rotation of the armature. This sets up a rapidly-repeating "hammering" effect between the balls and the races of the bearings, normal to the armature axis, and which hastens the eventual breaking down of the bearings. The life of the bearings, and therefore that of the magneto is substantially extended by "preloading" the bearings in a manner provided by this invention. Preloading as here understood is defined as absorbing all initial "play" between the elements of the bearings by a force directed axially, and then applying an additional force. The resulting load is then fixed permanently during assembly.

It is an object, therefore, of this invention to provide a means of preloading the ball bearings of a magneto by applying a suitable pressure axially to the armature shaft while assembling the magneto, and fixing the assembly under this pressure.

Another object is to provide a means of preloading bearings which dispenses with subsequent adjustment.

Another object is to provide a means of permanently preloading bearings at a fixed pressure, precluding later attempts to disturb the adjustment.

Another object is to provide a means of assembling a disposable magneto.

Further objects and advantages of this invention will become apparent from a consideration of the following detailed description taken in connection with the accompanying drawings wherein an embodiment of the invention is shown. It is to be understood, however, that the invention is not limited to the details disclosed, but includes all such variations and modifications as fall within the spirit of the invention.

Referring to the drawings:

FIG. 3 is a view of the means employed for preloading the bearings during assembly.

FIG. 4 is an enlarged axial view of a portion of FIG. 2 with parts removed.

FIG. 5 is an enlarged fragmentary view of a portion of FIG. 1 showing the fastening means employed to establish the preloading condition of the bearings.

FIG. 6 is a section taken at 6—6 of FIG. 5.

Figure 1:
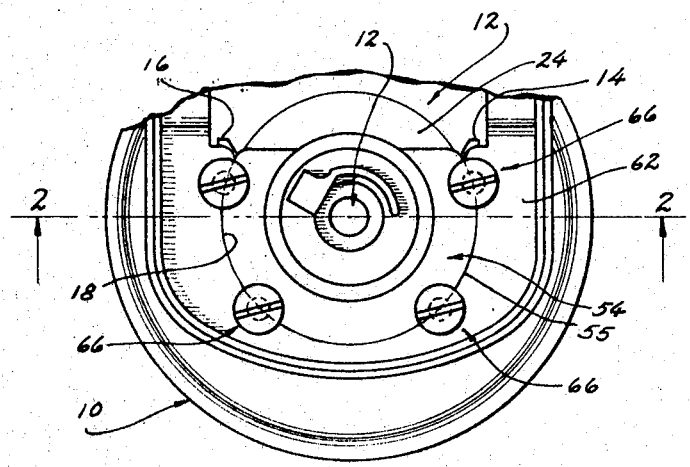
FIG. 1 is an end view of a portion of a magneto with portions removed, and embracing the invention.

Referring again to the drawings:

The magneto embracing this invention comprises a frame 10 and an armature assembly 12. Frame 10 has cast integrally therewith opposed pole laminations 14 and 16, which laminations are machined upon their mutually-opposed surfaces to conform to a cylindrical bore or passageway 18 about an axis 20.

Armature assembly 12 comprises an armature shaft 22 having affixed thereon an armature 24 having integral therewith two diametrically-opposed segments 26, only one of which are shown. Armature assembly 12 is positioned co-axially in bore 18, and is free to rotate therein.

Armature assembly 12 is provided with a first bearing assembly 28 and a second bearing assembly 30. Bearing 28 comprises an inner race 32 made with a press fit on shaft 22, and abuts a shoulder 34. Outer race 36 is positioned relative to inner race 32 so as to leave an annular space between the races. The usual raceway is provided in races 32 and 36 for the balls 38.

Bearing assembly 30 is of the type known as an axial-thrust bearing and comprises an inner "cone" or race 40 and an outer race 42, both races having the usual raceway for the balls 44. Inner race 40 abuts a shoulder 46 of shaft 22. A shoulder or seat 48 is provided in frame 10 to axially support race 42, and a disk 50 positioned intermediate race 42 and shoulder 48 serves to retain grease in bearing 30. Bearing 30 is supported normal to the axis 20 in a bore 52.

A bearing plate 54 embraces bearing 28, having an abutment 56 and an annular bore 58. A clearance groove 60 prevents plate 54 from contacting race 32 of bearing 28, for reasons that will be clear from the description of the preloading operation.

Bore 18 extends to the face 62 of frame 10. Bearing plate 54 has an outer periphery 55 that is of a size that permits it to enter bore 18 freely, but without excessive freedom, in that the plate must position armature 12 concentrically in bore 18. When armature assembly 12 is inserted in frame 10, and within bore 18, and with plate 54 in place on bearing 28, the plate is free axially relative to face 62, being limited axially only by the relative position of the bearing 28.

The gist of this invention is embraced in the means of fixing the armature, with its bearings, in place. Plate 54 and bore 18 in this instance, are provided with four apertures 64 as shown in FIG. 5, part of these apertures being provided on the periphery of bore 18 of frame 10, and part on the periphery of plate 54 and indicated as 55. When plate 54 is assembled in bore 18 the mutually-related apertures result in cylindrical apertures 64 having a diameter corresponding approximately to the pitch diameter of the screws 66. Screws 66 are of the type called "self-tapping" screws, and which have a full thread. Four "flats" such as 68 are provided at the end of screws 66 and which serve to facilitate tapping their own threads as they are driven into the apertures 64 by a screwdriver. Screws 66, however, do not cut their own threads by removing metal from the frame 10 or the plate 54 as they are being driven in place. Inasmuch as holes 64 correspond to the pitch diameter of the thread of screw 66, the advancing screw will force the metal of the plate and frame into the root of the screw. This results in a full thread without removing any metal or causing chips.

Figure 2:
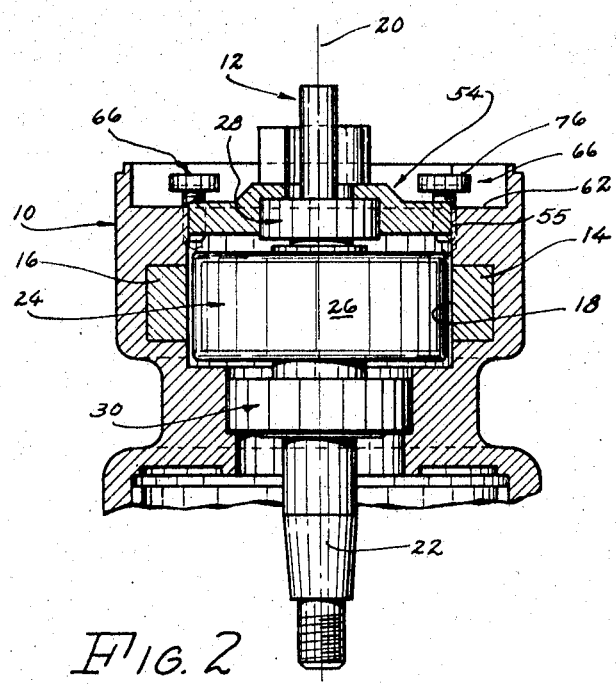
FIG. 2 is an axial section taken at 2—2 of FIG. 1.

The means of preloading, prior to assembling a magneto by means of the present invention is shown in FIG. 3. The frame 10 is placed upon a support such as 70. The armature 12 is inserted in bore 18 with bearing 30 in bore 52 and in contact with shoulder 48. Plate 54 is then placed upon bearing 28 and rotated until the aperture portions in frame 10 and plate 54, comprising apertures 64, are in alignment as indicated in FIG. 5. A load-applying means such as 72 is then brought into contact with the plate 54. The preload pressure is then applied in the direction of the arrow 74 which traces the path of the preloading force which force terminates at shoulder 48 of frame 10, as shown in FIG. 4. The pressure for this purpose is from 10 to 20 pounds. While the preload pressure is thus being applied, screws 66 are driven by rotation into the apertures 64 by the customary screwdriver to the approximate depth shown in FIGS. 2 and 6. The heads 76 of screws 66 do not necessarily contact the plate 54 or frame 10. When screws 66 are being driven as above described, they form threads in both portions of apertures 64, thereby "keying" plate 54 axially with relation to frame 10 and in bore 18. Inasmuch as screws 66 are driven into apertures 64 while the preloading pressure is being applied, and the axial relationship between the frame and the plate is fixed, the bearings will be preloaded at that pressure. All axial and radial "play" is thereby absorbed, with the additional preloading pressure being applied with respect to the bearings 28 and 30.

It is apparent that, if screws 66 are not later disturbed, the preload condition will be permanent only to be destroyed by normal wear of the bearings, or removal of the screws 66.

The above being a complete description of an illustrative embodiment of the invention, what is claimed as new and desired to be secured by Letters Patent of the United States is:

1. A method of preloading the bearings of a device, said device comprising a frame having a bore, a bearing seat in said frame at one end of said bore, a rotating member in said bore comprising a shaft having a first and a second bearing spaced apart axially thereon, said second bearing being supported axially in said seat, a bearing plate embracing said first bearing and fitted axially-free in said bore, and having a peripheral, axially-directed surface partially co-extensive with the surface of said bore, said method comprising supporting said frame, and applying a preload pressure axially to said bearing plate in the direction of said second bearing, rotatably forcing a plurality of cylindrical axially-directed male thread-producing securing members into the complementary interstice formed by the co-extensive peripheral surfaces of said bore and said plate to produce threads in said surfaces, of said bore and said plate, and simultaneously thereby, fix said bearing plate axially in said bore and establish said bearings in the preloaded condition.

References Cited

UNITED STATES PATENTS

| 3,326,584 | 11/1963 | Tann | 287—52.09 |
| 2,802,957 | 8/1957 | Gievers | 310—90 X |

FOREIGN PATENTS

| 551,412 | 1/1923 | France. |

JOHN F. CAMPBELL, *Primary Examiner.*

ROBERT W. CHURCH, *Assistant Examiner.*

U.S. Cl. X.R.

29—149.5, 432, 446, 526; 29—598; 287—52; 310—90, 91